E. W. SEAHOLM.
DRIVING MECHANISM FOR MOTOR VEHICLES.
APPLICATION FILED OCT. 15, 1919.
1,434,355.
Patented Oct. 31, 1922.
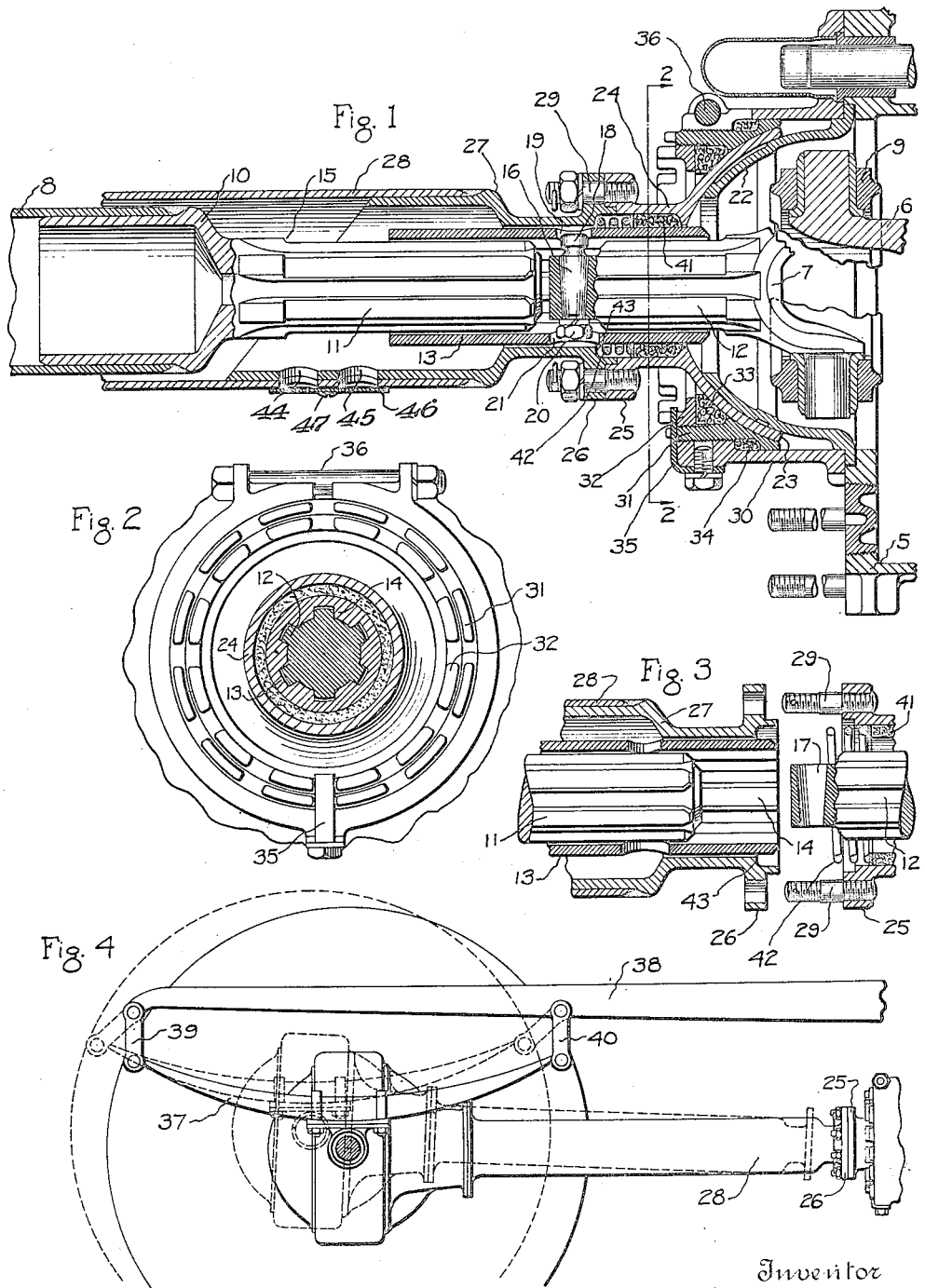
Inventor
ERNEST W. SEAHOLM.
By Attorneys Patented Oct. 31, 1922.

1,434,355

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

DRIVING MECHANISM FOR MOTOR VEHICLES.

Application filed October 15, 1919. Serial No. 330,834.

*To all whom it may concern:*

Be it known that I, ERNEST W. SEAHOLM, a citizen of the United States, and a resident of Detroit, county of Wayne, and State of Michigan, have invented certain new and useful Improvements in Driving Mechanism for Motor Vehicles, of which the following is a full, clear, concise, and exact description, such as will enable others skilled in the art to which the invention relates to make and use the same, reference being made therein to the accompanying drawings, which form a part of this specification.

My invention relates to automobiles, motor trucks and similar self-propelled vehicles, and particularly to the driving mechanism whereby and through which the rear driven axle of the vehicle is operated from the power plant thereof through a suitable propeller or driving shaft.

The principal object of my invention is to provide improved driving mechanism intermediate the power shaft and the rear axle of a motor vehicle, the same having features of construction whereby the driving means may be disassembled more readily than has heretofore commonly been the case if and when it becomes necessary to disconnect the power plant from the driving axle of the vehicle.

A further object of my invention is to provide an improved coupling or joint construction whereby a driving member, which is ordinarily in the form of a driven yoke of a universal joint, may be readily coupled with and uncoupled from the driving or propeller shaft of the vehicle through which the rear axle thereof is driven.

A further object of my invention is to provide an improved joint or coupling device intermediate the transmission gearing and the rear driving axle of the vehicle whereby and by the use of which the forward end of the torque tube commonly present, and the forward end of the propeller shaft, may be more readily connected with and disconnected from a relatively stationary member carried by the transmission gearing casing and the driven yoke of a universal joint than has heretofore commonly been the case, to thereby permit the torque tube and the driving shaft within same to be readily disconnected from the transmission unit should it become necessary to do so.

A further object of my invention is to provide certain new and useful improvements in and relating to the ball and socket joint or connection through which the forward end of a torque tube is connected with the transmission mechanism casing of the vehicle.

With the above and other objects of invention in view my invention consists in the improved driving mechanism for motor vehicles illustrated in the accompanying drawing and hereinafter described and claimed, and in such variations and modifications thereof, within the scope of the concluding claims, as will be obvious to those skilled in the art to which my invention relates.

Referring to the drawing wherein the preferred embodiment of my invention is illustrated:

Figure 1 is a fragmentary view showing the rear end of the transmission mechanism, and the forward end of the torque tube and driving shaft of a motor vehicle in section upon a longitudinally extending plane.

Figure 2 is a view showing a section upon a transverse plane indicated by the line 2—2 Figure 1, looking toward the right.

Figure 3 is a fragmentary view similar to Figure 1, but showing the torque tube and driving shaft disconnected from the transmission casing and driving yoke.

Figure 4 is a fragmentary view showing the rear end of a motor vehicle in a conventional manner and illustrating the way in which the rear driving axle and its enclosing housing are supported from the frame of the vehicle, in the preferred embodiment or use of my invention herein disclosed.

Referring to the drawing, the reference numeral 5 designates the rear end of the transmission gearing casing of the power plant of a motor vehicle and within which the change speed gears and the usual universal joint are located, and which gearing, so far as concerns this present invention, may be of any form or type. The said gearing in the embodiment of the invention herein shown and described comprises a driving yoke 6 of a universal joint, from which yoke motion is communicated to the rear or driven yoke 7 of the said joint; said last mentioned yoke being referred to herein as a driving member because of the fact that it is operatively connected with and acts to drive the propeller or driving shaft 8 of the vehicle. The yokes 6 and 7 are provided with trunnions, and are connected with one another through the usual ring 9 commonly present in universal joints; although the universal joint here referred to may obviously be of any suitable form so far as concerns this present invention, as the invention herein in no way concerns or involves the universal joint.

The driving shaft 8 is shown as tubular in form and as connected with an end coupling member 10 by suitable welding or other methods, which coupling member is provided with keys or splines 11 corresponding in form and number with other splines 12 provided upon the driving member 7, or driven yoke of the universal joint in the form of my invention herein disclosed. It is obvious that the rearwardly extending splined portion of the driving member or yoke 7 provides a stub shaft which is in alignment with the similarly splined forward end of the coupling member 10, which is in fact a part of the driving shaft.

The forward end or coupling member 10 of the driving shaft and the driving member 7 are connected with one another so that the driving shaft will be driven from the universal joint through and by means of a coupling tube or sleeve 13 which surrounds the adjacent end portions of the said members, and which sleeve is provided with internal keys or splines 14 which interlock with the splines 11 and 12 of the said driving member and driving shaft. The axes of the driving member and driving shaft are arranged in alignment, and this sleeve is slidable longitudinally upon and along the driving member and end 10 of the driving shaft from the position in which it is shown in Figure 1 into a position such that its left-hand end engages shoulders 15 provided for arresting its movement, the said sleeve being shown in its rear-most and left-hand position in Figure 3 of the drawing.

The sleeve 13 is held in the position in which it is shown in Figure 1 to thereby maintain a driving connection between the parts which it connects by means of a removable tapering key or pin 16 extending through a hole 17 in the rear end of the driving member 7 and the head 18 of this pin lies within a hole 19 provided in the wall of the sleeve 13 when the sleeve is in the connecting position shown. The key in question is held in place by a nut 20 which lies within a hole 21 in the wall of the sleeve and located opposite the hole 19; from which it will be appreciated that upon removing the nut 20 the key may be removed through the hole 19 of the sleeve 13, and the sleeve moved to the left to thereby disconnect the parts connected thereby and interrupt the driving connection between the driving member and the driving shaft. The key, however, cannot be removed unless and until the forward end of the torque tube 28 which surrounds the sleeve 13 has been first moved rearward, so as to expose the key, as will hereinafter appear; so that the tube itself provides in effect an additional safety device for preventing the key from leaving the opening in which it is located and for maintaining a driving connection between the parts which are coupled together by the coupling sleeve 13.

The rear end of the transmission casing supports a spherical ball coupling member 22 upon which a socket member 23 in the form of a spherical shell is movable universally, which socket member is provided with a neck 24 having a flange 25 to which the flange 26 at the front end of a coupling member 27 secured to the forward end of the torque tube 28 within which the driving shaft is located may be secured, as by means of suitable stud bolts 29 extending through the said flanges, to thereby detachably connect the forward end of the torque tube or rather of the coupling member 27 thereof with the said socket member 23; the socket member being fixed in position relative to longitudinal movement of the torque tube so that the tube as a whole may be moved bodily away from the socket member upon removing the nuts of the bolts 29, although the socket member is as a matter of course capable of limited oscillatory movement upon the ball member 22 as the body of the vehicle partakes of the movements permitted by the supporting springs.

A tubular housing 30 encloses the universal joint provided by the yoke members 6, 7 and trunnion ring 9, and encloses also the joint between the ball member 22 and socket member 23, and the socket member is held in place relative to the ball coupling member by means of a ring 31 in threaded engagement with the said housing. A second gland or ring 32 is in threaded engagement with the ring 31 which holds the socket 23 to the ball 22; and suitable packings 33, 34 are provided between the ring 32 and the socket 23, and between the holding ring 31 and the housing 30, to thereby prevent the access of dirt to the surfaces of the universal joint provided by the members 22, 23 and keep their surfaces properly lubricated. The rings 31 and 32 are both held in place and prevented from turning by a keeper 35 extending into recesses provided in the members in question, as clearly shown in Figures 1 and 2; and the housing 30 is split at its outer or left hand end and a tie bolt 36 is provided for compressing the same to thereby tighten the holding ring 31 and hold the parts of the joint in permanent fixed relation.

The improved joint or connection wherein my invention consists is used in connection with a rear driving axle which is movable bodily in a direction longitudinally of the vehicle, so that upon removing the nuts of the stud bolts 29 the rear axle with its housing to which the rear end of the torque tube 28 is connected may be moved rearward to the left, to thereby move the forward end of the torque tube into the position in which it is shown in Figure 3. This rearward movement of the torque tube uncovers and exposes the key 16 so that it can be removed and the sleeve 13 slid to the left and into the position in which it is shown in Figure 3, thereby disconnecting the torque tube and the driven shaft within the same from the transmission gearing casing and from the driving member whereby the shaft is driven.

In order to provide for the rearward bodily movement of the rear axle of the vehicle the entire rear axle structure (by which term I means to include the rotating axle or axles of the vehicle, the housing therefor, and the differential gearing through which the axles are operated from the driving shaft) is secured to springs 37, one upon each side of the vehicle, which springs in turn are connected with the side bars 38 of the usual frame of the vehicle through swinging links or shackles 39, 40 at the ends of the springs and through which the springs are connected with the side members of the frame. This structure as will be appreciated permits the entire rear axle structure to be moved rearward upon disconnecting the forward end of the torque tube from the relatively stationary socket member 23 to which it is connected, during which movement the axle, the springs, and the torque tube assume the approximate position in which they are shown in dotted lines in Figure 4 of the drawing. This movement, as above explained, exposes the key 16, after which the same may be removed and the driving shaft and driving member disconnected one from the other by sliding the sleeve 13 rearward on the driving shaft.

The neck 24 of the socket member 23 through which the driving member and coupling tube 13 extend is preferably provided with packing at 41 for the said tube; said packing being acted upon by a spring 42 the end of which abuts against a shoulder 43 when the parts are assembled and in use to thereby compress the packing and keep the tube from rubbing against the interior of the neck 24 and coupling member 27.

The torque tube is shown as provided with a pair of adjacent openings 44, 45, the same being normally closed by a cover plate 46 secured to the torque tube by a bolt or screw 47, and which plate is removable from over said openings so that access may be had to the interior of the torque tube. After the parts have been disconnected as shown in Figure 3, and it is desired to reassemble them; a screw driver or other tool may be inserted through the opening 44 and made to engage the rear end of the sleeve 13; whereby the sleeve may be pushed forward and partly over the adjacent ends of the driving member and driving shaft, the tool being used as a lever as will be appreciated.
Thereafter the tool may be inserted in the other hole 45 and the sleeve pushed further along and into its final position, whereupon the pin or key 16 may be introduced into the passage 17 thereby securing the sleeve in position relative to the adjacent ends of the driving member and driving shaft. Finally the torque tube is moved to the right and fastened to the socket member 23, the parts being thus returned to the assembled position in which they are illustrated in Figure 1.

It will be appreciated, however, that my invention is not limited to the specific means illustrated for providing for movement of the axle structure longitudinally of the vehicle in disconnecting the parts, as any equivalent mechanism whereby such movement is permitted may be employed and is regarded as being within the scope of my invention as the same is defined in the concluding claims.

Having thus described and explained my invention, I claim and desire to secure by Letters Patent:

1. In driving mechanism for motor vehicles and in combination with a rear driving axle movable bodily in a direction longitudinally of the vehicle, and a driving shaft operatively connected with said axle and movable therewith; a relatively fixed driving member arranged in axial alignment with said driving shaft and adapted to drive the same; a sleeve surrounding adjacent end portions of said driving member and driving shaft and which sleeve is slidable upon both said driving member and said shaft; means whereby said sleeve is interlocked with said driving member and with said driving shaft so that said shaft will be driven from and by said driving member;
means for holding said sleeve in place and in engagement with the adjacent end portions of said driving member and driving shaft, to thereby detachably couple said parts together; a torque tube enclosing said driving shaft and terminating adjacent the forward end thereof, and the rear end of which tube is connected with said axle so as to partake of the longitudinal movement thereof and of said driving shaft; and a relatively stationary member with which the forward end of said torque tube is detachably connected.

2. In driving mechanism for motor vehicles and in combination with transmission mechanism having a rotating driving member and a relatively stationary member surrounding said driving member, a driving shaft of constant length extending from said driving member to the rear axle of the vehicle and whereby the vehicle is driven; a sleeve surrounding adjacent end portions of said driving member and driving shaft and non-rotatably connected with both said members to thereby transmit motion to said driving shaft, and which sleeve is slidable upon and along both said driving member and said driving shaft; means for holding said sleeve in engagement with the adjacent end portions of said driving member and driving shaft; a torque tube detachably connected with said stationary member and surrounding said driving shaft and extending to the rear axle of the vehicle and movable with said rear axle away from said stationary member and said driving member; and means for detachably connecting the forward end of said torque tube with the stationary member aforesaid.

3. In driving mechanism for motor vehicles and in combination with a casing having a spherical coupling member, a spherical socket member movable upon said coupling member and held in contact therewith and having a neck, transmission mechanism within said casing, and a rotating driving member driven by said transmission mechanism and extending along the neck aforesaid; a driving shaft of constant length through which the vehicle is driven and one end of which lies adjacent the driving member aforesaid; a sleeve slidable upon said driving shaft and non-rotatably connected with both said driving member and said shaft; means for holding said sleeve in engagement with both said driving member and said shaft; and a torque tube of constant length surrounding said driving shaft and detachably connected with the neck aforesaid of the said socket member, and into which said sleeve may be moved to disconnect said driving member and driving shaft.

4. In driving mechanism for motor vehicles and in combination with a rear driving axle, a driving shaft operatively connected with said axle; a driving member arranged in axial alignment with said driving shaft and adapted to drive the same; a sleeve surrounding the adjacent end portions of said driving member and driving shaft and which sleeve is slidable upon both said driving member and said shaft; means whereby said sleeve is interlocked with said driving member and with said driving shaft so that said shaft may be driven from and by said driving member; means for holding said sleeve in place and in engagement with the adjacent end portions of said driving member and driving shaft, to thereby detachably couple said parts together; a torque tube of constant length enclosing said driving shaft and into which said sleeve may be moved; and a relative stationary member with which the forward end of said torque tube is detachably connected.

5. In driving mechanism for motor vehicles and in combination with a rear driving axle movable bodily in a direction longitudinally of the vehicle, and a driving shaft operatively connected with said axle and movable therewith; a torque tube enclosing said driving shaft and terminating adjacent the forward end thereof, and the rear end of which tube is connected with said axle so as to partake of the longitudinal movement thereof hereinbefore mentioned; a transmission gearing casing; a driving member within said casing; means for detachably connecting said torque tube with said casing; and a sleeve enclosing the adjacent ends of said driving member and driving shaft and slidable upon the latter into said torque tube for detachably connecting said driving member with said driving shaft.

6. In driving mechanism for motor vehicles and in combination with a rear driving axle movable bodily in a direction longitudinally of the vehicle, and a driving shaft operatively connected with said axle and movable therewith; a torque tube enclosing said driving shaft and terminating adjacent the forward end thereof, and the rear end of which tube is connected with said axle so as to partake of the longitudinal movement thereof and of said driving shaft; a transmission gearing casing with which the forward end of said torque tube is detachably connected; and the rear end of which terminates adjacent the forward end of said driving shaft; and a driving member within said casing, means operable after said torque tube has been disconnected from said transmission gearing casing and moved rearward for connecting said driving member with and for disconnecting the same from said driving shaft without changing the positions of the ends of said driving member and driving shaft relative to one another.

7. In driving mechanism for motor vehicles and in combination with a transmission gearing casing having a relatively stationary coupling member provided with a neck, transmission mechanism within said casing, and a rotating driving member driven by said transmission mechanism and extending along the neck aforesaid; a driving shaft through which the vehicle is driven and one end of which lies adjacent to the driving member aforesaid; a coupling sleeve slidable upon said driving shaft and said driving member, and which sleeve is non-rotatably connected with both of said members; a torque tube surrounding said driving shaft and detachably connected with the neck aforesaid of said relatively stationary member; and a packing located within the neck aforesaid and surrounding said sleeve.

8. In driving mechanism for motor vehicles and in combination with a transmission gearing casing having a relatively stationary coupling member provided with a neck, transmission mechanism within said casing, and a rotating driving member driven by said transmission mechanism and extending along the neck aforesaid; a driving shaft through which the vehicle is driven and one end of which lies adjacent to the driving member aforesaid; a coupling sleeve slidable upon said driving shaft and said driving member, and which sleeve is non-rotatably connected with both of said members; a torque tube surrounding said driving shaft and detachably connected with the neck aforesaid of said relatively stationary member; a packing located within the neck aforesaid and surrounding said sleeve; and a spring surrounding said sleeve and acting between said packing and a shoulder carried by said torque tube, and which spring is adapted to compress said packing.

9. In driving mechanism for motor vehicles and in combination with a transmission gearing casing having a spherical ball coupling member; a spherical socket coupling member movable upon said ball member; a housing carried by said casing and surrounding said ball and socket members; a holding ring engaging said socket member and the periphery of which is in threaded engagement with said housing; a gland in threaded engagement with said holding ring; packing material located between said gland and said socket member; a torque tube connected with said spherical socket member; and a driving shaft extending along said torque tube.

10. In driving mechanism for motor vehicles and in combination with a transmission gearing casing having a spherical ball coupling member; a spherical socket coupling member movable upon said ball member and having a neck; a torque tube detachably connected with said neck; a housing carried by said casing and surrounding said ball and socket members; a holding ring the periphery of which is in threaded engagement with the interior of said housing, and the inner end of which ring engages said socket member to thereby hold same in contact with said ball member; a gland in threaded engagement with the interior of said holding ring; packing located between said gland and said socket member; and a driving shaft located within and extending along said torque tube.

11. A transmission construction including in combination two adjacent and alining shafts having similarly splined ends, a sleeve having splined slots therein, said sleeve being slidable longitudinally on said shafts, said sleeve having a pair of openings on opposite sides thereof, one of said shafts having an opening extending transversely of said shaft and therethrough, said opening being adapted to register with the openings in said sleeve, a pin insertible in said opening, said pin having a head portion adapted to engage in one of said sleeve openings to secure the sleeve against sliding movement on said shafts, and means operable through the other sleeve opening for securing said pin in said shaft opening.

12. A transmission device including in combination a pair of splined shafts, a splined sleeve slidable thereon, one of said shafts having a tapered opening extending therethrough and registering with a pair of openings in the sleeve, a tapered pin insertible through one of said openings, means operable through the other opening for securing said pin and wedging the same in the tapered opening to lock said sleeve against sliding movement on said shafts, said locking means and said pin extending transversely of said sleeve and being of less length than the exterior diameter of said sleeve, and a tube surrounding said sleeve.

13. A detachable driving unit for motor vehicles, including a universal joint through which power is transmitted, a housing for said joint, a stub shaft connected with said joint and extending through said housing, a driving shaft in alinement with said stub shaft, a non-rotatable sleeve slidably mounted on the ends of said shafts for removably connecting them together, means on said driving shaft for permitting said sleeve to slide thereon out of engagement with said stub shaft, and a torque tube inclosing said drive shaft adapted to be removably connected directly to said housing, said tube having openings therein for permitting access to said sleeve whereby it may be moved to connecting or disconnecting position on said drive shaft.

14. A universal joint, a casing surrounding said joint, a tube connected to said casing, a shaft in said tube, a sleeve having slidable but non-rotatable connection both with said shaft and with a member of said joint, and means for securing said sleeve against sliding movement relative to said joint member, said means being rendered accessible upon movement of said tube and shaft away from said casing.

In testimony whereof I affix my signature.

ERNEST W. SEAHOLM.